(12) United States Patent
Kasahara et al.

(10) Patent No.: US 11,740,432 B2
(45) Date of Patent: Aug. 29, 2023

(54) LENS DRIVING DEVICE, CAMERA MODULE, AND CAMERA-MOUNTED DEVICE

(71) Applicants: Yuichi Kasahara, Tokyo (JP); Norikazu Kudo, Tokyo (JP)

(72) Inventors: Yuichi Kasahara, Tokyo (JP); Norikazu Kudo, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 177 days.

(21) Appl. No.: 17/097,104

(22) Filed: Nov. 13, 2020

(65) Prior Publication Data

US 2021/0149152 A1    May 20, 2021

(30) Foreign Application Priority Data

Nov. 15, 2019 (JP) ................ 2019-207076

(51) Int. Cl.
*G02B 7/28* (2021.01)
*G02B 7/09* (2021.01)
(Continued)

(52) U.S. Cl.
CPC ................ *G02B 7/28* (2013.01); *G02B 7/09* (2013.01); *G02B 7/282* (2013.01); *G03B 3/10* (2013.01);
(Continued)

(58) Field of Classification Search
CPC ........ G02B 7/282; G02B 7/09; G02B 27/646; G02B 7/08; G02B 15/173; G02B 15/14; G02B 15/177; G02B 15/22; G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065;
(Continued)

(56) References Cited

U.S. PATENT DOCUMENTS

2018/0100987 A1    4/2018 Wu et al.
2018/0113322 A1*  4/2018 Sugawara ................ G03B 5/04
(Continued)

FOREIGN PATENT DOCUMENTS

CN    109975942    7/2019

*Primary Examiner* — Darryl J Collins
*Assistant Examiner* — Tamara Y. Washington

(57) ABSTRACT

A lens driving device, a camera module and a camera-mounted device that can improve the stability the moving operation of AF movable part are provided.
A lens driving device includes a base; a lens holder disposed apart from the base in a light axis direction, and configured to hold a lens part; and an autofocus driving part including an auto-focusing coil and an auto-focusing magnet, and configured to move the lens holder in the light axis direction with respect to the base.
The auto-focusing coil is disposed at the lens holder.
The auto-focusing magnet is disposed at the base.
The base includes a magnet holding part provided to protrude to a light reception side in the light axis direction, the magnet holding part being configured to hold the auto-focusing magnet while positioning the auto-focusing magnet.
A damper is disposed between the magnet holding part and the lens holder.

9 Claims, 9 Drawing Sheets

(51) Int. Cl.
*G03B 3/10* (2021.01)
*G03B 5/02* (2021.01)

(52) U.S. Cl.
CPC ........ *G03B 5/02* (2013.01); *G03B 2205/0069* (2013.01)

(58) Field of Classification Search
CPC .... G02B 15/10; G02B 15/163; G02B 15/167; G02B 23/02; G02B 7/02; G02B 7/022; G02B 7/102; G02B 7/14; G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/00; G02B 9/24; G03B 3/10; G03B 5/02; G03B 2205/0069; H01F 7/066; H01F 7/081; H01F 7/17; H01F 2007/086; H04N 5/225

See application file for complete search history.

(56) References Cited

U.S. PATENT DOCUMENTS

2018/0239217 A1* 8/2018 Konuma .............. H04N 5/2254
2018/0246296 A1* 8/2018 Sugawara .............. H04N 5/225
2019/0204531 A1 7/2019 Sugawara

* cited by examiner

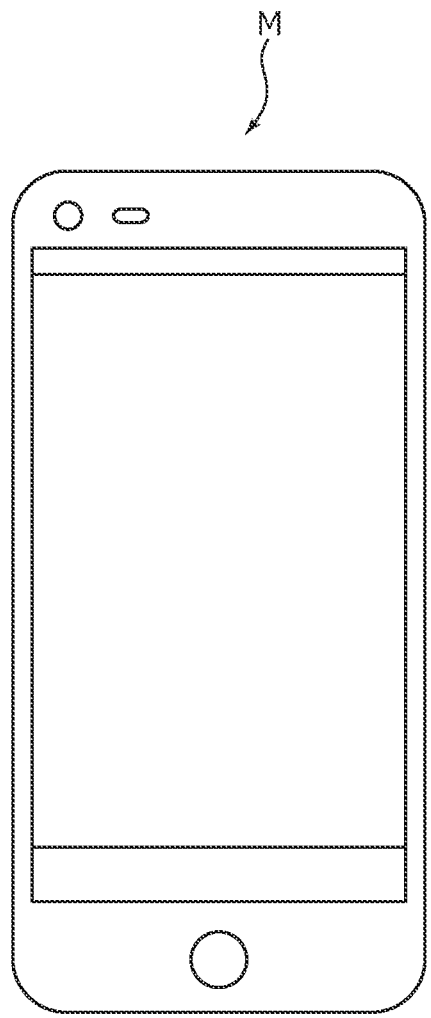
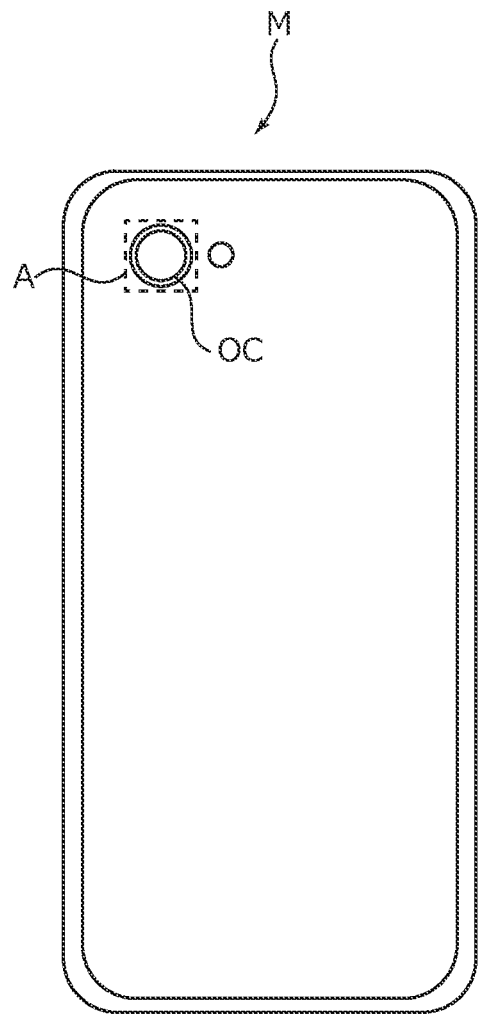
FIG. 1A
FIG. 1B

LENS DRIVING DEVICE, CAMERA MODULE, AND CAMERA-MOUNTED DEVICE

RELATED APPLICATION(S)

This application claims the benefit of priority of Japanese Patent Application No. 2019-207076 filed on Nov. 15, 2019, the contents of which are incorporated by reference as if fully set forth herein in their entirety.

FIELD AND BACKGROUND OF THE INVENTION

The present invention relates to an auto-focusing lens driving device, a camera module having an autofocus function, and a camera-mounted device.

In general, a mobile terminal such as a smartphone is provided with a small-sized camera module. A lens driving device having an autofocus function (hereinafter referred to as "autofocus (AF) function") for automatic focusing for taking a subject image is applied to such a camera module (e.g., PTL 1).

An auto-focusing lens driving device includes an autofocus fixing part (hereinafter referred to as "AF fixing part"), an autofocus movable part (hereinafter referred to as "AF movable part") that is movable with respect to the AF fixing part in the light axis direction, and an autofocus driving part (hereinafter referred to as "AF driving part") that moves the AF movable part in the light axis direction. A lens part is mounted in the AF movable part. The AF driving part is composed of a voice coil motor (VCM) including an auto-focusing coil (hereinafter referred to as "AF coil") disposed in the AF movable part, and an auto-focusing magnet (hereinafter referred to as "AF magnet") disposed in the AF fixing part, for example. Automatic focusing is performed by moving the AF movable part in the light axis direction with respect to the AF fixing part by utilizing the driving force of the VCM. Note that the AF coil may be disposed in the AF fixing part, and the AF magnet may be disposed in the AF movable part.

In the lens driving device utilizing the VCM, the positional relationship between the AF coil and the AF magnet is important to stabilize the moving operation of the AF movable part. In PTL 1, the position of the AF magnet is set by fixing the AF magnet to a side surface of a cover of the AF fixing part.

CITATION LIST

Patent Literature

PTL 1
US Patent Application Publication No. 2018/0100987

SUMMARY OF THE INVENTION

Technical Problem

However, in the lens driving device disclosed in PTL 1, the positional relationship between the AF magnet and the AF coil fixed to the lens holder of the AF movable part is affected at least by the attaching accuracy between the lens holder and the base, and the attaching accuracy between the base and the cover, and the distance between the AF coil and the AF magnet may become non-uniform. As a result, the thrust generated at the AF coil is destabilized, and in turn, the moving operation of the AF movable part is destabilized.

An object of the present invention is to provide a lens driving device, a camera module and a camera-mounted device that can improve the stability of the moving operation of the AF movable part.

Solution to Problem

A lens driving device according to an embodiment of the present invention includes a base; a lens holder disposed apart from the base in a light axis direction, and configured to hold a lens part; and an autofocus driving part including an auto-focusing coil and an auto-focusing magnet, and configured to move the lens holder in the light axis direction with respect to the base. The auto-focusing coil is disposed at the lens holder. The auto-focusing magnet is disposed at the base. The base includes a magnet holding part provided to protrude to a light reception side in the light axis direction, the magnet holding part being configured to hold the auto-focusing magnet while positioning the auto-focusing magnet. A damper is disposed between the magnet holding part and the lens holder.

A camera module according to an embodiment of the present invention includes the lens driving device; a lens part mounted in the lens driving device; and an image-capturing part configured to capture a subject image formed by the lens part.

A camera-mounted device according to an embodiment of the present invention includes a camera-mounted device that is an information device or a transport device; and the camera module.

BRIEF DESCRIPTION OF THE SEVERAL VIEWS OF THE DRAWINGS

FIGS. 1A and 1B illustrate a smartphone in which a camera module according to an embodiment of the present invention is mounted;

DESCRIPTION OF SPECIFIC EMBODIMENTS OF THE INVENTION

An embodiment of the present invention is elaborated below with reference to the drawings.

FIG. 1 illustrates smartphone M (camera-mounted device) in which camera module A according to an embodiment of the present invention is mounted. Camera module A has an autofocus function, and automatically performs focusing when taking a subject image.

Figure 2:
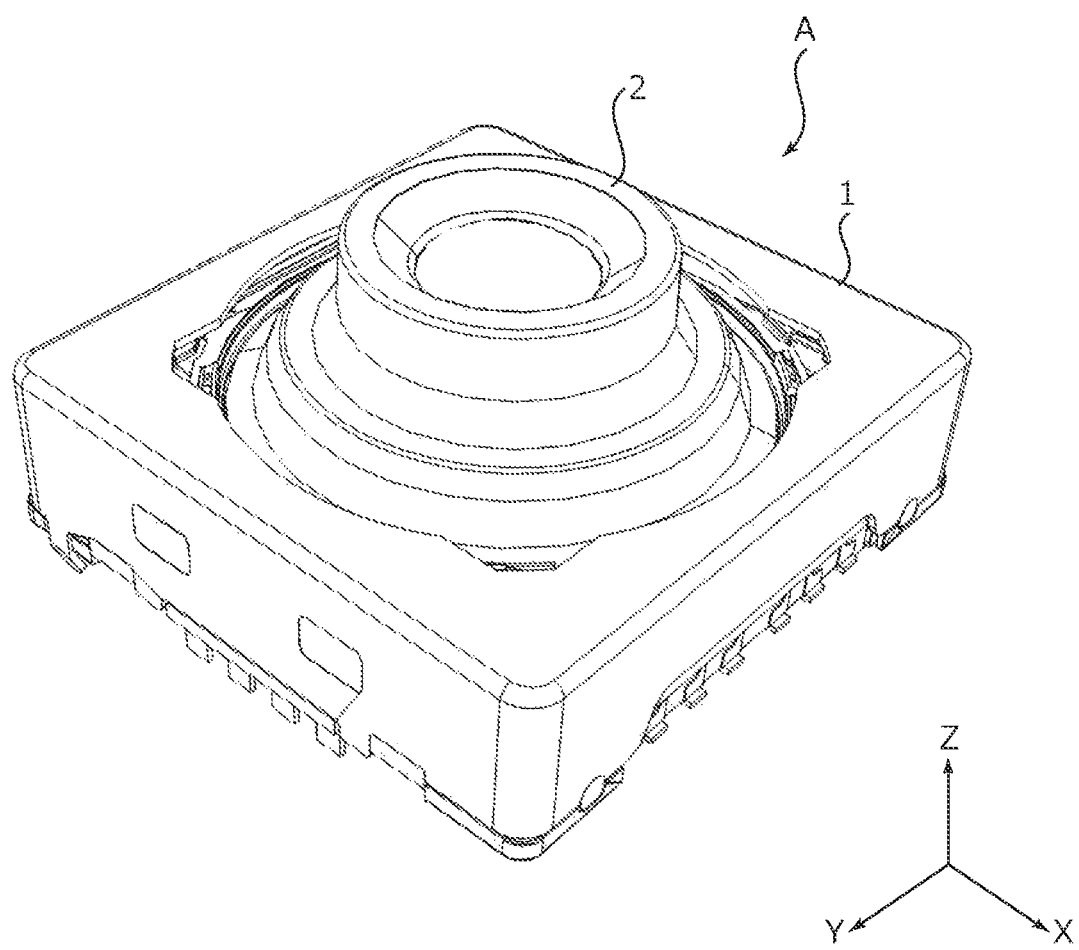
FIG. 2 is a perspective view illustrating an external appearance of the camera module.
Figure 3:
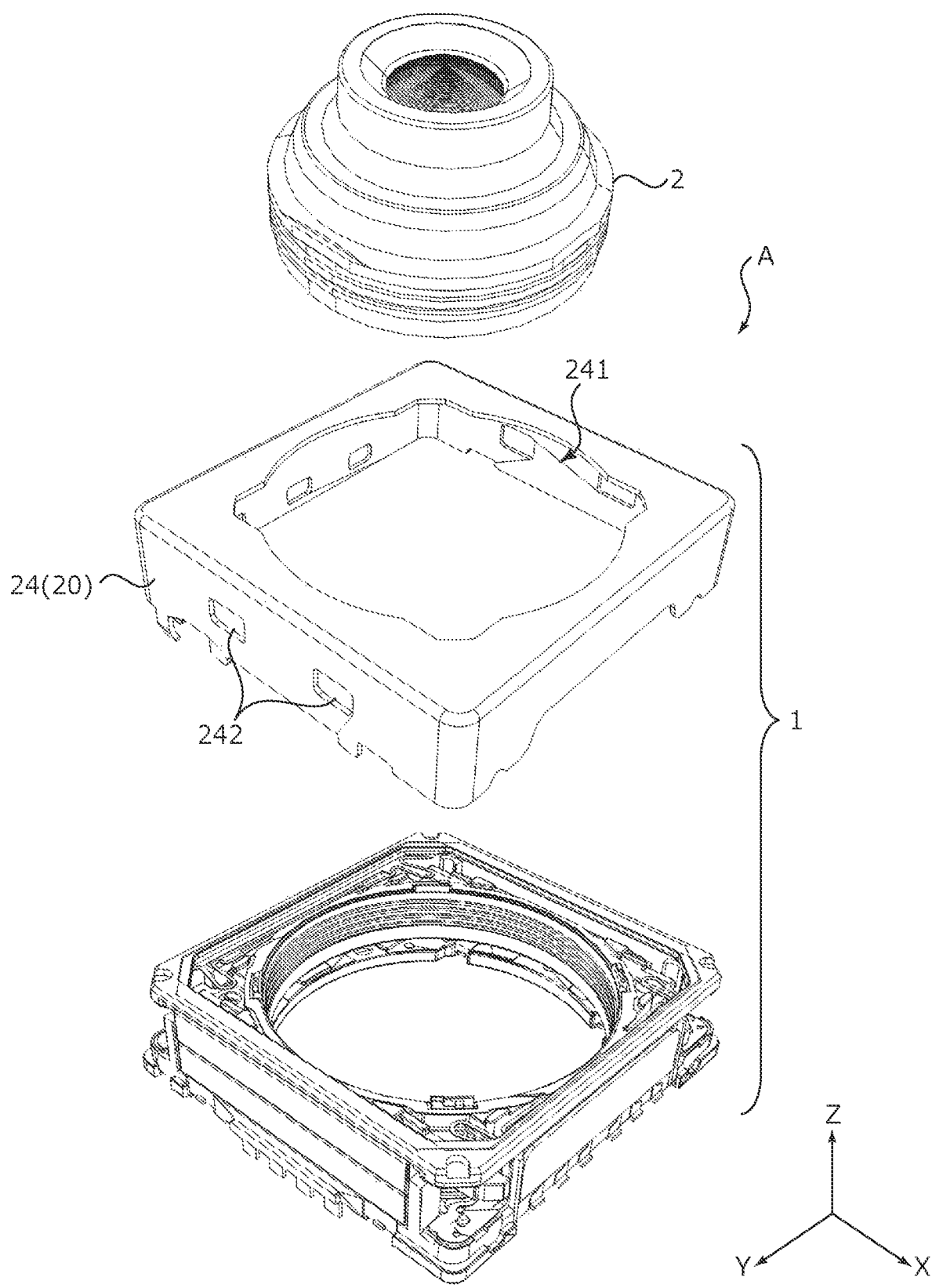
FIG. 3 is an exploded perspective view of the camera module.
Figure 4:
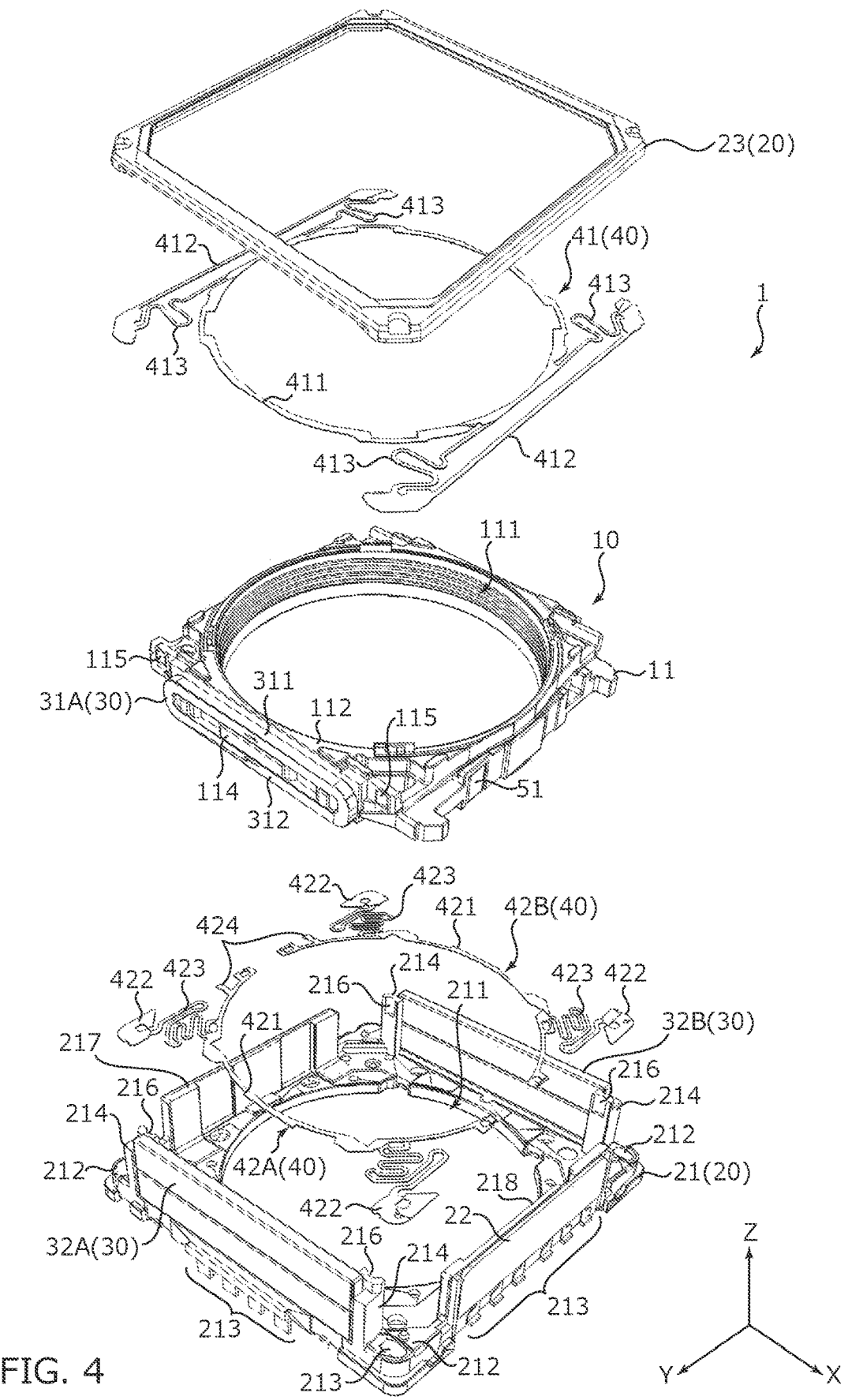
FIG. 4 is an exploded perspective view of a lens driving device as viewed from the top side.
Figure 5:
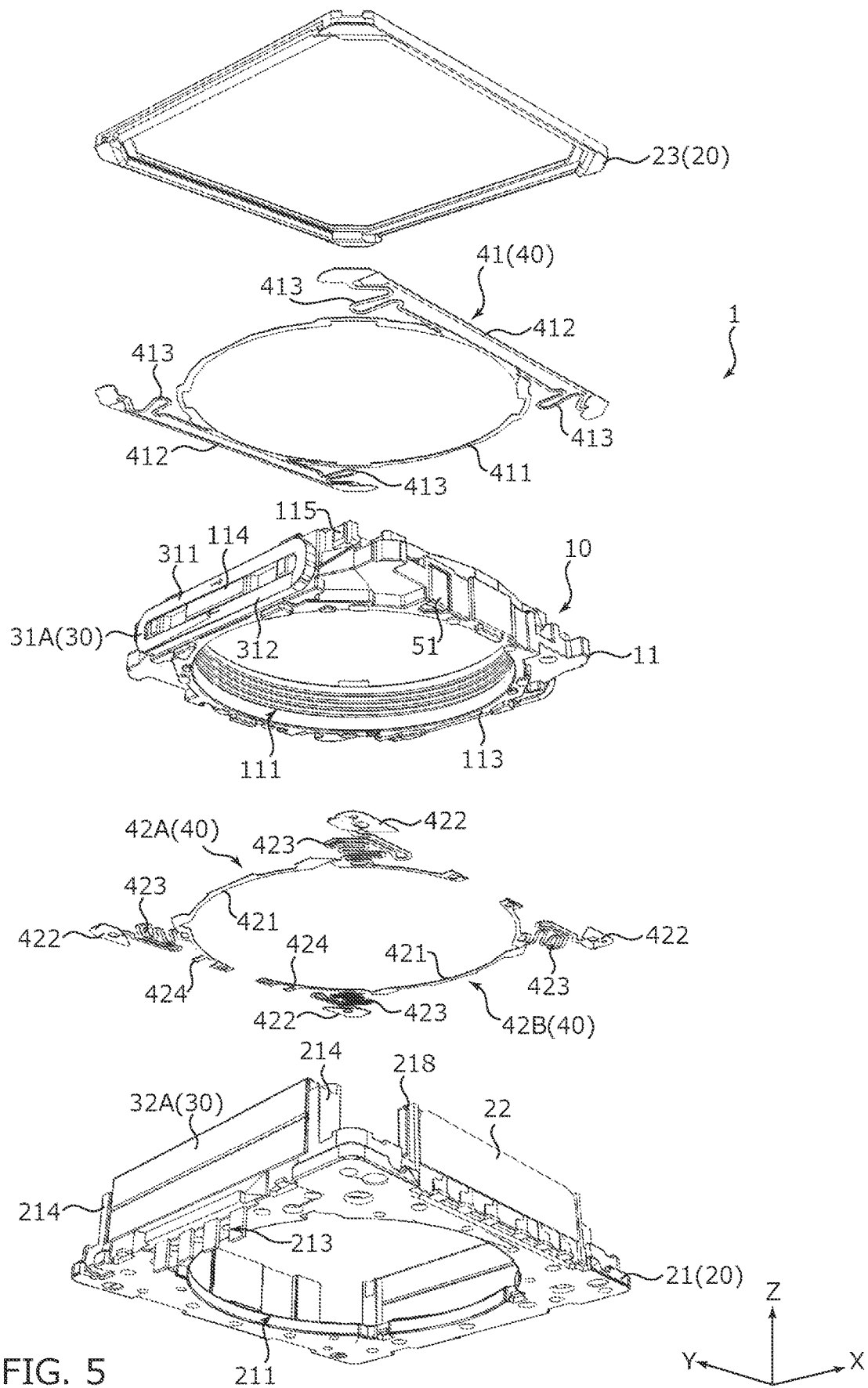
FIG. 5 is an exploded perspective view of the lens driving device as viewed from the bottom side.
Figure 6:
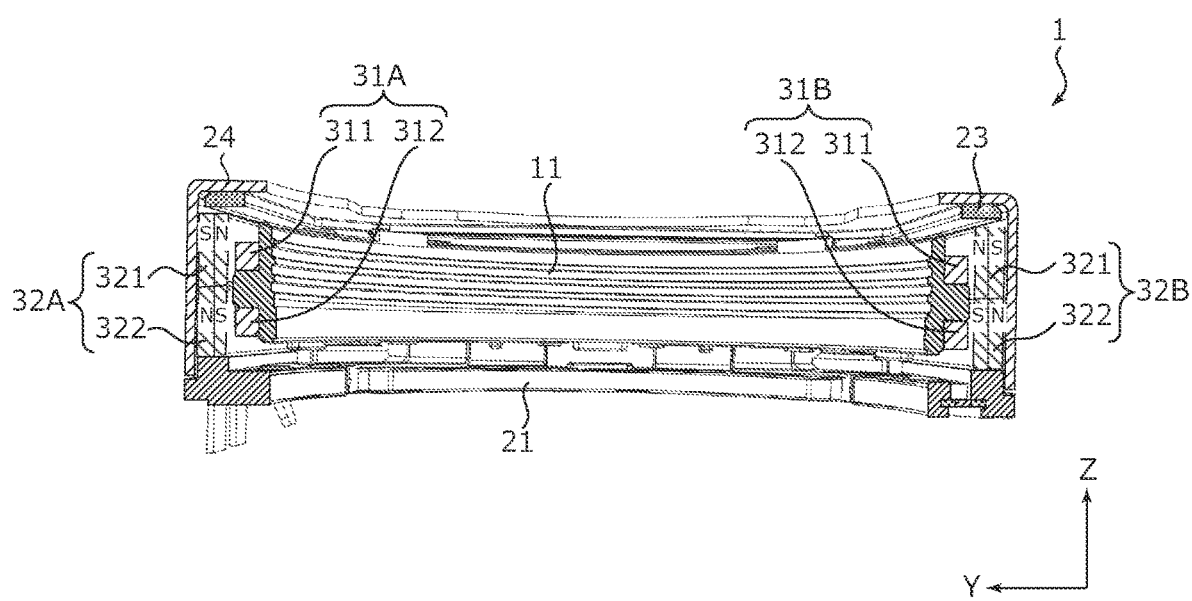
FIG. 6 is a sectional view of a lens driving device along the Y direction.
Figure 7:
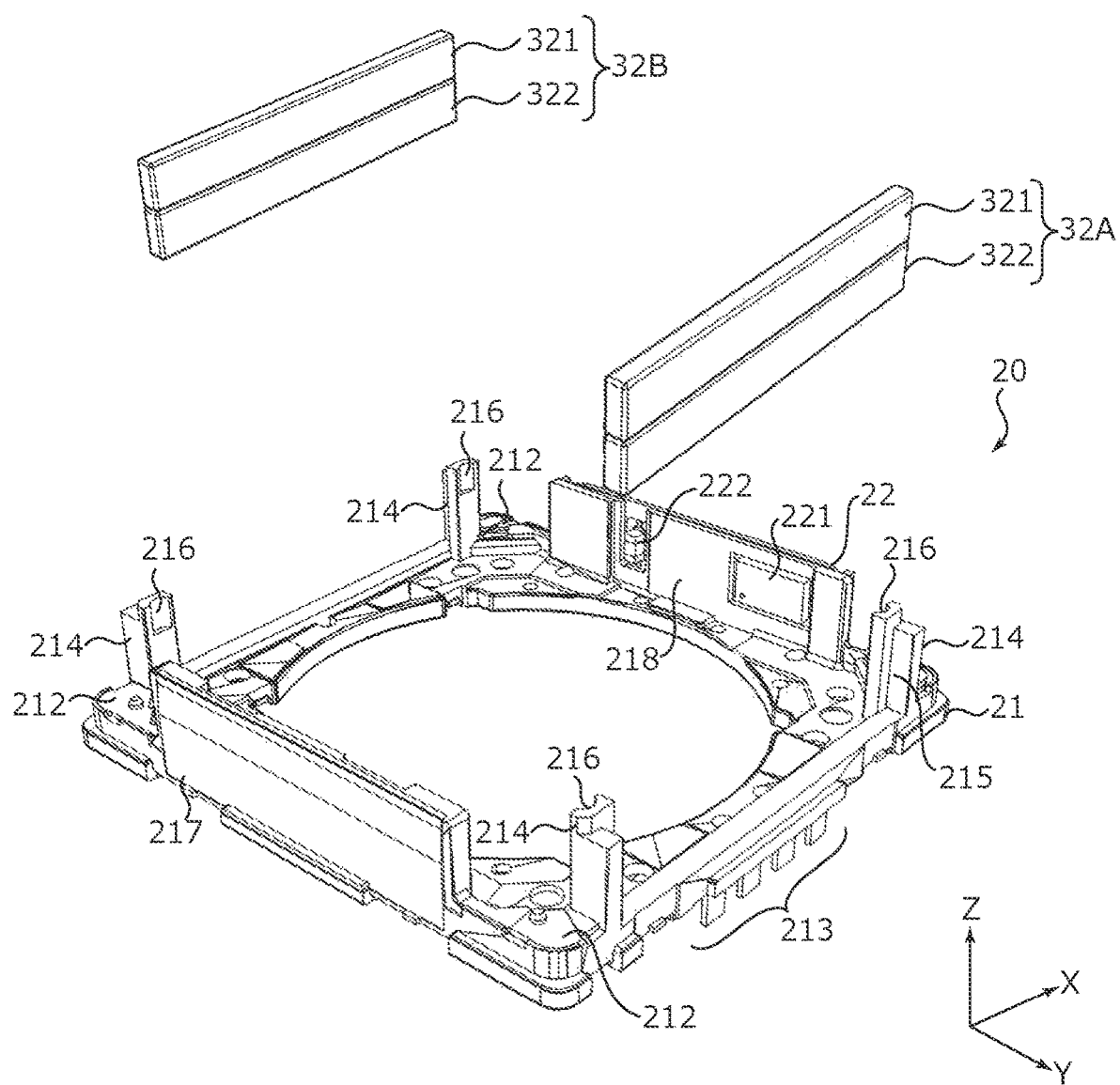
FIG. 7 is an exploded perspective view of an AF fixing part.

FIG. 2 is a perspective view illustrating an external appearance of camera module A. FIG. 3 is an exploded perspective view of camera module A. FIG. 4 is an exploded perspective view of lens driving device 1 as viewed from the light reception side in the light axis direction. FIG. 5 is an exploded perspective view of lens driving device 1 as viewed from the image formation side in the light axis direction. FIG. 6 is a sectional view of a lens driving device along the Y direction. Note that in FIGS. 4 and 5, cover 24 is omitted.

As illustrated in FIGS. 2 to 5, the present embodiment is described using an orthogonal coordinate system (X, Y, Z). Other drawings described later also use the common orthogonal coordinate system (X, Y, Z). Lens driving device 1 is mounted such that the Z direction is the front-rear direction when an image is actually taken with smartphone M. Specifically, the Z direction is the light axis direction, in which + side in the Z direction is the light reception side (also referred to as "macro position side") in the light axis direction, and − side (also referred to as "infinity position side") in the Z direction is the image formation side in the light axis direction. In addition, the X direction and the Y direction orthogonal to the Z axis are referred to as "direction orthogonal to light axis".

Camera module A includes lens part 2 in which a lens is housed in a lens barrel having a substantially cylindrical shape, AF lens driving device 1, an image-capturing part (not illustrated) that captures a subject image formed by lens part 2, and the like.

The image-capturing part (not illustrated) includes an image-capturing element (not illustrated) and an image sensor substrate (not illustrated) on which the image-capturing element is mounted, and the image-capturing part is disposed on the image formation side of lens driving device 1 in the light axis direction. The image-capturing element (not illustrated) is composed of a CCD (charge-coupled device) image sensor, a CMOS (complementary metal oxide semiconductor) image sensor or the like, for example. The image-capturing element (not illustrated) captures a subject image formed by lens part 2, converts a light signal into an electric signal, and outputs the signal to a control part (not illustrated) that performs image processing and the like.

Lens driving device 1 includes AF movable part 10, AF fixing part 20, AF driving part 30, elastic support part 40 and the like. AF movable part 10 is disposed apart from AF fixing part 20 on the inner side in the radial direction, and is coupled to AF fixing part 20 with elastic support part 40.

AF movable part 10 is a part that moves in the light axis direction upon focusing, and includes AF coils 31A and 31B that constitute AF driving part 30. AF fixing part 20 includes AF magnets 32A and 32B that constitute AF driving part 30. Specifically, lens driving device 1 adopts a moving coil system using a voice coil motor composed of AF coils 31A and 31B and AF magnets 32A and 32B.

In the present embodiment, lens holder 11 and AF coils 31A and 31B constitute AF movable part 10. Base 21, AF magnets 32A and 32B, spacer 23, and cover 24 constitute AF fixing part 20. Upper elastic support member 41 and lower elastic support members 42A and 42B constitute elastic support part 40.

Lens holder 11 is a cylindrical member having a substantially rectangular shape in plan view as viewed from the light axis direction, and includes lens housing part 111 at the center. Lens part 2 (see FIGS. 2 and 3) is fixed to lens housing part 111 by bonding or screwing.

At a portion along the periphery of the opening of lens housing part 111 in the top surface thereof, lens holder 11 includes upper spring fixing part 112 to which upper elastic support member 41 is fixed. A positioning piece (whose reference numeral is omitted) protruding to the light reception side in the light axis direction is provided in upper spring fixing part 112, for example. With the positioning piece provided in upper spring fixing part 112, upper elastic support member 41 is positioned.

In addition, at a portion along the periphery of the opening of lens housing part 111 in the bottom surface thereof, lens holder 11 includes lower spring fixing part 113 to which lower elastic support members 42A and 42B are fixed. A positioning piece (whose reference numeral is omitted) protruding to the image formation side in the light axis direction is provided in lower spring fixing part 113, for example. With the positioning piece provided in lower spring fixing part 113, lower elastic support members 42A and 42B are positioned.

At two side surfaces along the X direction thereof, lens holder 11 includes coil attaching portions 114 to which AF coils 31A and 31B are disposed. Coil attaching portions 114 have shapes corresponding to the air-core portions of AF coils 31A and 31B, and have elliptical shapes (rectangular shapes with rounded corners) in their entirety. In the present embodiment, coil attaching portions 114 are partially recessed. In addition, in lens holder 11, Z-position detecting magnet 51 for detecting the position of AF movable part 10 in the light axis direction is disposed.

Lens holder 11 includes damper installation part 115 at a portion opposite to magnet holding part 214 of base 21. Damper installation part 115 is formed from the end portion on the light reception side toward the image formation side in the light axis direction and recessed inward in a semi-columnar shape, for example.

AF coils 31A and 31B are flat air-core coils that are energized upon focusing, and are wound along coil attaching portions 114. By adopting flat coils as with AF coils 31A and 31B, they can be disposed only at the magnetic circuit portions of AF magnets 32A and 32B. Thus, in comparison with the case where the AF coil is formed by wounding it over the whole circumference of lens holder 11, the driving efficiency is improved, and weight reduction and power saving can be achieved.

Each of AF coils 31A and 31B has an elliptical shape, and includes first straight line part 311 and second straight line part 312. AF coils 31A and 31B are disposed such that the coil surface is parallel to the light axis and that, in this case, the XZ surface is the coil surface. That is, AF coils 31A and 31B are disposed such that first straight line part 311 is located on the light reception side in the light axis direction (upper side), and second straight line part 312 is located on the image formation side in the light axis direction (lower side). The end portions of AF coils 31A and 31B are laid along the peripheral surface of lens holder 11 and are electrically connected with lower elastic support members 42A and 42B.

Each of AF coils 31A and 31B is formed of an enameled wire such as a polyurethane copper wire composed of a copper wire material covered with urethane resin varnish, for example.

Base 21 is a member having a substantially square shape in plan view as viewed from the light axis direction, and includes circular opening 211 at the center. In camera module A, an image-capturing part (not illustrated) is disposed on the image formation side of base 21 in the light axis direction.

At the four corners thereof, base 21 includes lower spring fixing parts 212 to which lower elastic support members 42A and 42B are fixed. Lower spring fixing part 212 includes a positioning boss (whose reference numeral is omitted) protruding to the light reception side in the light axis direction, for example. With the positioning boss, lower elastic support members 42A and 42B are positioned.

Terminal metal fitting 213 is embedded in base 21 by insert molding, for example. In the present embodiment, terminal metal fitting 213 includes four terminal metal fittings that electrically connect control IC 221 and a power-source line and a signal line of an image sensor substrate (not illustrated), and two terminal metal fittings that connect control IC 221 and lower elastic support members 42A and 42B.

In the present embodiment, base 21 includes magnet holding parts 214 on both sides in the longitudinal direction of the two sides along the X direction (two sides that faces each other in the Y direction), that is, in regions around the four corners of base 21. Magnet holding part 214 is provided to protrude to the light reception side in the light axis direction, and positions and holds AF magnets 32A and 32B. Magnet holding part 214 function as a rib that reinforces the strength of base 21.

L-shaped cutout part 215 extending along the light axis direction is formed in magnet holding part 214. Two surfaces of cutout part 215 function as reference surfaces for attaching AF magnets 32A and 32B. AF magnets 32A and 32B are disposed and positioned such that end portions of AF magnets 32A and 32B fit (engage) with cutout part 215 formed in magnet holding part 214.

In the upper part of magnet holding part 214, damper installation part 216 that holds the damper is formed. Damper installation part 216 is extended along the light axis direction and recessed on the inside of magnet holding part 214. In the present embodiment, damper installation part 216 is formed in a semicircular columnar shape. Note that the depth of damper installation part 216 is set such that the movement of AF movable part 10 with respect to AF fixing part 20 is not hampered by damper 60. In the present embodiment, the depth of damper installation part 216 is set to substantially ⅓ of the height of magnet holding part 214.

In addition, base 21 includes upright wall 217 at one side along the Y direction, and FPC holding part 218 at the other side along the Y direction. Upright wall 217 and FPC holding part 218 protrude to the light reception side in the light axis direction. In FPC holding part 218, an opening (whose reference numeral is omitted) to which mounted parts of control unit 22 (e.g., control IC 221 and bypass capacitor 222) are fit is formed. Together with magnet holding part 214, upright wall 217 and FPC holding part 218 function as ribs that reinforce the strength of base 21.

Cover 24 is attached to the peripheral surface of base 21. In the state where cover 24 is placed at base 21, cover 24 is fixed by bonding to upright wall 217 of base 21, AF magnets 32A and 32B fixed to base 21, and control unit 22 mounted in base 21.

Each of AF magnets 32A and 32B is a double-sided bipolar magnet composed of first magnet 321 and second magnet 322. First magnet 321 and second magnet 322 are magnetized opposite to each other in the inner-and-outer direction.

AF magnets 32A and 32B are located outside AF coils 31A and 31B (see FIG. 6). AF magnets 32A and 32B are disposed such that first magnet 321 is located on the light reception side in the light axis direction, and second magnet 322 is located on the image formation side in the light axis direction. Specifically, first magnet 321 faces first straight line part 311 of AF coils 31A and 31B, and second magnet 322 faces second straight line part 312 of AF coils 31A and 31B.

The magnetic field of first magnet 321 crosses first straight line part 311, and the magnetic field of second magnet 322 crosses second straight line part 312. The direction of the magnetic field of first magnet 321 and the direction of the magnetic field of second magnet 322 are opposite to each other, and accordingly, when AF coils 31A and 31B are energized, Lorentz forces of the same direction in the Z direction are generated at first straight line part 311 and second straight line part 312. In this manner, an AF voice coil motor is composed of AF magnets 32A and 32B and AF coils 31A and 31B.

Note that the magnetization directions at AF magnets 32A and 32B and the current directions at AF coils 31A and 31B are set such that the directions of the Lorentz forces generated at AF coils 31A and 31B upon energization are the same direction.

A non-magnetic layer (not illustrated) may be disposed between first magnet 321 and second magnet 322. By adjusting the height of the non-magnetic layer, the region occupied by first magnet 321 and second magnet 322 (the areas of the surfaces opposite to first straight line part 311 and second straight line part 312) can be easily adjusted while maintaining the entire height of AF magnets 32A and 32B.

Control unit 22 includes electronic components such as control IC 221 and bypass capacitor 222. Control IC 221 and bypass capacitor 222 are mounted in a print wiring board (whose reference numeral is omitted). Control IC 221 is disposed opposite to Z-position detecting magnet 51 disposed in lens holder 11.

A Hall element (not illustrated) that detects variation of the magnetic field by utilizing Hall effect is incorporated in control IC 221. When AF movable part 10 (lens holder 11) moves in the light axis direction, the magnetic field of position detecting magnet 51 changes. Such a change in magnetic field is detected by the Hall element to detect the position of AF movable part 10 in the light axis direction. By setting the arrangement of the Hall element and the Z-position detecting magnet such that a magnetic flux in proportion to the amount of movement of AF movable part 10 crosses the detection surface of the Hall element, the hole output in proportion to the amount of movement of AF movable part 10 can be obtained.

On the basis of the result (hole output) of detection at the Hall element incorporated therein and a control signal received through lower elastic support members 42A and 42B, control IC 221 controls the energization current of AF coils 31A and 31B.

Cover 24 is a member having a square shape in plan view as viewed from the light axis direction. In its top surface, cover 24 includes opening 241 having a shape corresponding to lens part 2 mounted in lens holder 11 (see FIG. 2). From this opening 241, lens part 2 faces the outside. Spacer 23 is fixed on the rear side of the top surface (eaves part) of cover 24.

In addition, cover 24 holds AF magnets 32A and 32B at two side surfaces along the X direction. Resin inlet 242 for injecting an adhesive agent is provided in the side surface of cover 24. AF magnets 32A and 32B are fixed to the side surface of cover 24 by bonding, for example. Note that magnet holding part 214 of base 21 sets the positions of AF magnets 32A and 32B.

Cover 24 may be formed of a magnetic material and may functions as a yoke, for example. The light reception side of AF magnets 32A and 32B in the light axis direction is covered with the eaves part of the periphery of opening 241 of cover 24. Since a magnetic circuit is formed with cover 24 and AF magnets 32A and 32B, the driving efficiency is improved. By utilizing cover 24 as a yoke, the number of components is reduced, and thus the man hour for assembly can be reduced while reducing the weight.

Spacer 23 is a frame member having a square shape in plan view as viewed from the light axis direction. Spacer 23 is fixed by bonding on the rear surface side of cover 24, for example. Spacer 23 is disposed between cover 24 and upper elastic support member 41.

Upper elastic support member 41 is a leaf spring (hereinafter referred to as "upper spring 41") composed of beryllium copper, nickel copper, titanium copper, stainless-steel or the like, for example. Upper spring 41 elastically supports AF movable part 10 (lens holder 11) with respect to AF fixing part 20 (spacer 23).

Upper spring 41 is formed by punching one sheet metal, for example. Upper spring 41 includes lens holder fixing part 411, spacer fixing part 412, and arm part 413. Lens holder fixing part 411 has a shape that matches upper spring fixing part 112 of lens holder 11, and is cut out at a portion corresponding to the positioning piece. Spacer fixing part 412 has a shape that matches spacer 23 with four corner portions having large areas. Arm part 413 couples lens holder fixing part 411 and spacer fixing part 412. Arm part 413 has a curved shape, and is elastically deformed when AF movable part 10 is moved.

Upper spring 41 is positioned and fixed to lens holder 11 in such a manner that a cutout part (whose reference numeral is omitted) of lens holder fixing part 411 is engaged with the positioning piece (whose reference numeral is omitted) of lens holder 11, for example. In addition, upper spring 41 is fixed to spacer 23 in such a manner that spacer fixing part 412 is bonded to the rear side of spacer 23, for example. When AF movable part 10 moves in the light axis direction, lens holder fixing part 411 is displaced together with AF movable part 10.

Lower elastic support members 42A and 42B are composed of two leaf springs (hereinafter referred to as "lower springs 42A and 42B") composed of beryllium copper, nickel copper, stainless-steel or the like, for example. Lower springs 42A and 42B elastically support AF movable part 10 (lens holder 11) with respect to AF fixing part 20 (base 21).

Lower springs 42A and 42B are formed by punching one sheet metal, for example. Each of lower springs 42A and 42B includes lens holder fixing part 421, base fixing part 422, and arm part 423. Lens holder fixing part 421 has a shape that matches lower spring fixing part 113 of lens holder 11. Arm part 423 couples lens holder fixing part 421 and base fixing part 422. Arm part 423 partially has a zigzag shape and elastically deforms when AF movable part 10 moves.

Coil connecting part 424 is provided in lens holder fixing part 421. Coil connecting part 424 is electrically connected to AF coils 31A and 31B by soldering, for example. Base fixing part 422 is electrically connected to terminal metal fitting 213 disposed in base 21 by soldering, for example. Power is fed to AF coils 31A and 31B through lower springs 42A and 42B.

Lower springs 42A and 42B are positioned and fixed to lens holder 11 in such a manner that a fixation hole (whose reference numeral is omitted) of lens holder fixing part 421 is fitted to a positioning piece (whose reference numeral is omitted) of lens holder 11, for example. In addition, lower springs 42A and 42B are positioned and fixed to base 21 in such a manner that a positioning boss (whose reference numeral is omitted) of base 21 is fitted to a fixation hole (whose reference numeral is omitted) of base fixing part 422, for example. Lens holder fixing part 421 is displaced together with AF movable part 10 when AF movable part 10 moves in the light axis direction.

When automatic focusing is performed in lens driving device 1, AF coils 31A and 31B are energized. When AF coils 31A and 31B are energized, a Lorentz force is generated at AF coils 31A and 31B due to the interaction between the magnetic field of AF magnets 32A and 32B and the current flowing in AF coils 31A and 31B. The direction of the Lorentz force (the Z direction) is orthogonal to the direction of the magnetic field of AF magnets 32A and 32B and the direction of the current flowing in AF coils 31A and 31B. Since AF magnets 32A and 32B are fixed, a reactive force acts on AF coils 31A and 31B. With this reactive force serving as a driving force of the AF voice coil motor, AF movable part 10 including AF coils 31A and 31B moves in the light axis direction, thus performing focusing.

In a non-energization state where no focusing is performed, AF movable part 10 is held by upper elastic support member 41 and lower elastic support members 42A and 42B in a state where AF movable part 10 is suspended between the infinity position and the macro position (hereinafter referred to as "reference state"), for example. That is, with upper elastic support member 41 and lower elastic support members 42A and 42B, AF movable part 10 is elastically supported such that AF movable part 10 is displaceable to both sides in the Z direction in the state where AF movable part 10 is positioned with respect to AF fixing part 20. When focusing is performed, the direction of the current is controlled in accordance with whether AF movable part 10 is moved from the reference state to the macro position side, or to the infinity position side. In addition, the value of the current is controlled in accordance with the movement length (stroke) of AF movable part 10 from the reference state.

Figure 8:
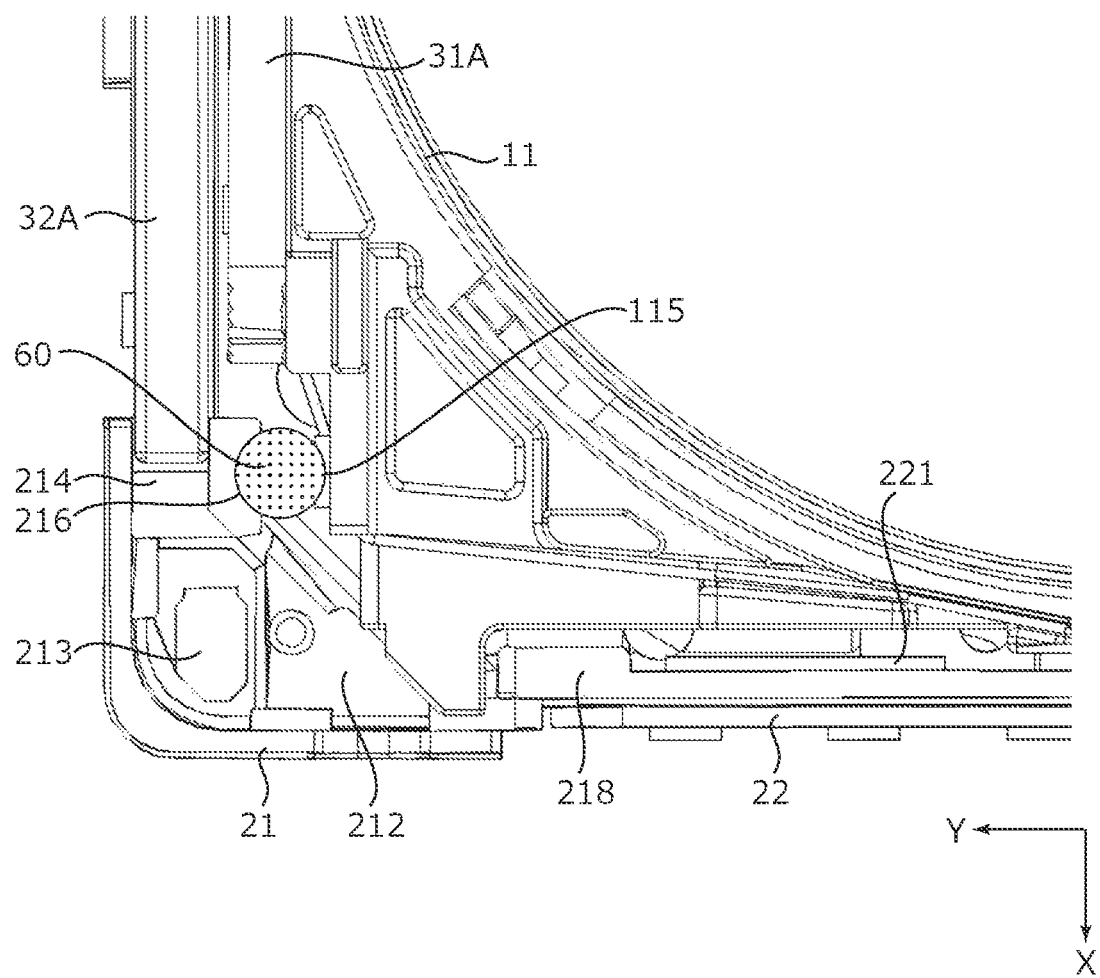
FIG. 8 is a plan view illustrating an attaching state of an AF magnet and an installation state of a damper.

FIG. 8 illustrates a region around magnet holding part 214 of base 21 in an enlarged manner.

As illustrated in FIG. 8, AF magnet 32A is positioned in such a manner that an end portion of AF magnet 32A makes contact with the two surfaces of cutout part 215 of magnet holding part 214.

In addition, damper 60 is disposed in a space surrounded by damper installation parts 115 and 216 of lens holder 11 and base 21. In this manner, generation of unnecessary resonance (high-order resonance mode) is suppressed, and the stability of the moving operation of AF movable part 10 is improved. For damper 60, a silyl group polymer elastic adhesive agent of normal temperature curing type can be applied and can be easily applied using a dispenser, for example.

As described above, lens driving device 1 according to the embodiment includes base 21, lens holder 11 disposed apart from base 21 in the light axis direction and configured to hold lens part 2, and AF driving part 30 including AF coils 31A and 31B and AF magnets 32A and 32B and configured to move lens holder 11 with respect to base 21 in the light axis direction. AF coils 31A and 31B are disposed at lens holder 11, and AF magnets 32A and 32B are disposed at base 21. Base 21 includes magnet holding part 214 provided to protrude to the light reception side in the light axis direction and configured to hold AF magnets 32A and 32B while positioning of AF magnets 32A and 32B. In addition, damper 60 for suppressing unnecessary resonance is disposed between magnet holding part 214 and lens holder 11.

In lens driving device 1, AF magnets 32A and 32B are positioned and held by magnet holding part 214 of base 21, and thus the positional relationship between AF coils 31A and 31B and AF magnets 32A and 32B is not affected by the attaching accuracy between base 21 and cover 24. In this manner, the interval between AF coils 31A and 31B and AF magnets 32A and 32B can be uniformly controlled with high accuracy.

In addition, by utilizing magnet holding part 214 for positioning of AF magnets 32A and 32B, damper 60 can be easily disposed between base 21 and lens holder 11, and generation of unnecessary resonance can be suppressed.

Thus, lens driving device 1 can improve the stability of the moving operation of AF movable part 10.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, the number of the pairs of the AF coil and the AF magnet is not limited to the two pairs of the embodiment, and may be one, or three or more. When multiple pairs of the AF coil and the AF magnet are disposed, it is preferable that the pairs are disposed to be point symmetrical about with respect to the light axis. In this manner, the stability upon focusing is improved. In addition, in AF magnets 32A and 32B, first magnet 321 and second magnet 322 may be configured as one unit, or may be configured as stacked separate units.

While a smartphone is described as an example of a camera-mounted device including camera module A in the embodiment, the present invention is applicable to a camera-mounted device such as an information device or a transport device. The camera-mounted device serving as an information device is an information device including a camera module and a control part that processes image information obtained with the camera module, such as a camera-equipped mobile phone, a note-type personal computer, a tablet terminal, a mobile game machine, a webcamera, and a camera-equipped in-vehicle device (e.g., a rear-view monitor device or a drive recorder device). In addition, the camera-mounted device serving as a transport device is a transport device, such as an automobile, including a camera module and a control part that processes an image obtained with the camera module.

Figure 9A:
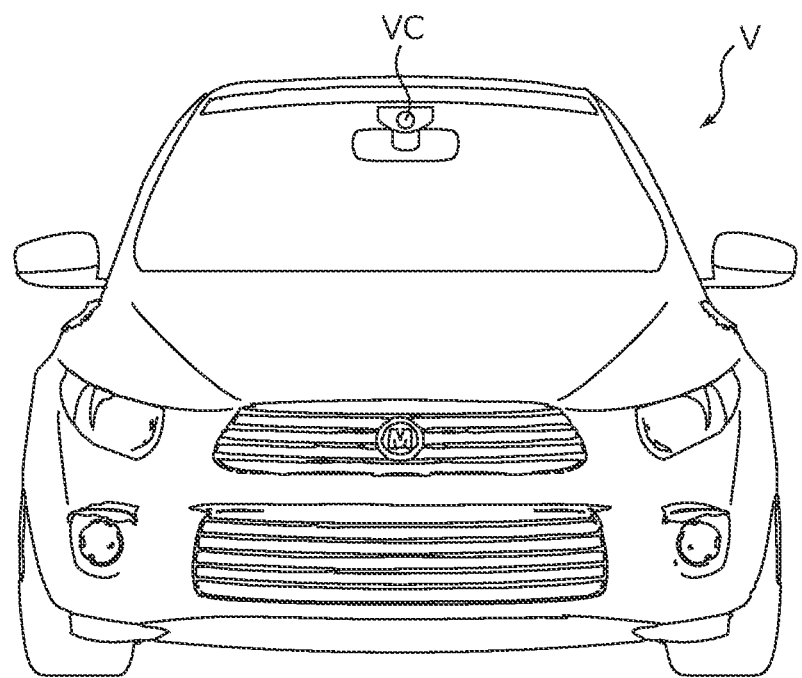
FIGS. 9A and 9B illustrate an automobile as a camera-mounted device in which an in-vehicle camera module is mounted.
Figure 9B:
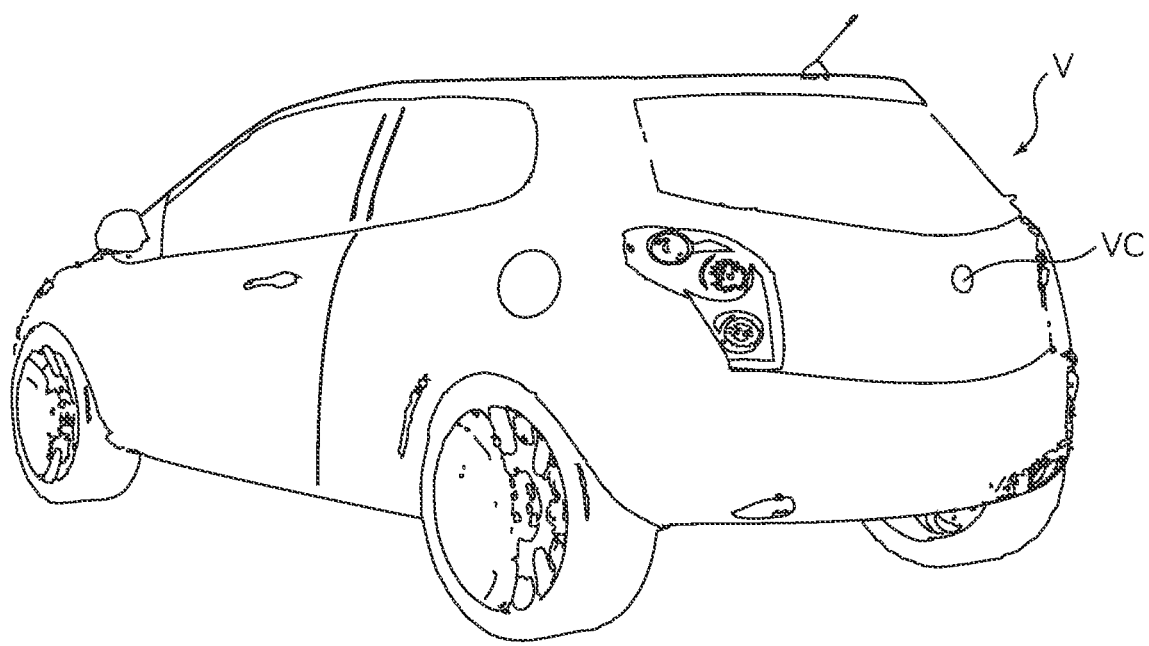

FIGS. 9A and 9B illustrate automobile V as a camera-mounted device in which camera module VC (Vehicle Camera) is mounted. FIG. 9A is a front view of automobile V, and FIG. 9B is a rearward perspective view of automobile V. In automobile V, camera module A described in the embodiment is mounted as in-vehicle camera module VC. As illustrated in FIGS. 9A and 9B, in-vehicle camera module VC is attached to a windshield to face forward, or attached to a rear gate to face rearward, for example. This in-vehicle camera module VC is used for a rear-view monitor, a drive recorder, collision-avoidance control, automatic operation control, and the like.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

What claimed is:

1. A lens driving device comprising:
a base;
a lens holder disposed apart from the base in a light axis direction, and configured to hold a lens part; and
an autofocus driving part including an auto-focusing coil and an auto-focusing magnet, and configured to move the lens holder in the light axis direction with respect to the base,
wherein the auto-focusing coil is disposed at the lens holder,
wherein the auto-focusing magnet is disposed at the base,
wherein the base includes a magnet holding part provided to protrude to a light reception side in the light axis direction, the magnet holding part being configured to hold the auto-focusing magnet while positioning the auto-focusing magnet,
wherein the magnet holding part and the lens holder each have opposing portions that face each other in the internal and external directions perpendicular to the light axis direction, and
wherein a damper is disposed to mechanically connect the opposing portions.

2. The lens driving device according to claim 1,
wherein the auto-focusing magnet has a rectangular cuboid shape; and
wherein the magnet holding part is disposed at positions corresponding to both end portions in a longitudinal direction of the auto-focusing magnet.

3. The lens driving device according to claim 2,
wherein the base has a rectangular shape in plan view as viewed from the light axis direction;
wherein the auto-focusing magnet is disposed along opposite two sides in the base; and
the magnet holding part is provided near four corners of the base.

4. The lens driving device according to claim 2, wherein the magnet holding part includes a cutout part to which an end portion of the auto-focusing magnet is fitted.

5. The lens driving device according to claim 1,
wherein the magnet holding part includes a damper installation part configured to dispose the damper; and
wherein the damper installation part is recessed inward, and formed from an end portion on the light reception side toward an image formation side in the light axis direction.

6. A camera module comprising:
the lens driving device according to claim 1;
a lens part mounted in the lens driving device; and
an image-capturing part configured to capture a subject image formed by the lens part.

7. A camera-mounted device comprising:
a camera-mounted device that is an information device or a transport device; and
the camera module according to claim 6.

8. The lens driving device according to claim 1,
wherein both or either of the magnet holding part and the lens holder have a damper installation part, and
wherein the damper installation part is recessed in the internal and external direction.

9. The lens driving device according to claim 1,
wherein the base and the magnet holding part are made of one member.

* * * * *